United States Patent [19]
Chang et al.

[11] Patent Number: 6,119,204
[45] Date of Patent: Sep. 12, 2000

[54] DATA PROCESSING SYSTEM AND METHOD FOR MAINTAINING TRANSLATION LOOKASIDE BUFFER TLB COHERENCY WITHOUT ENFORCING COMPLETE INSTRUCTION SERIALIZATION

[75] Inventors: Joseph Yih Chang, Cedar Park; James Nolan Hardage, Jr., Kyle; Jose Melanio Nunez; Thomas Albert Petersen, both of Austin, all of Tex.

[73] Assignees: International Business Machines Corporation, Armonk, N.Y.; Motorola, Inc., Schaumburg, Ill.

[21] Appl. No.: 09/108,157

[22] Filed: Jun. 30, 1998

[51] Int. Cl.[7] .............................. G06F 13/14; G06F 12/08
[52] U.S. Cl. ..................... 711/141; 711/144; 711/146; 711/207
[58] Field of Search ................................. 711/141, 144, 711/145, 146, 147, 148, 203, 206, 207

[56] References Cited

U.S. PATENT DOCUMENTS

| | | |
|---|---|---|
| 5,437,017 | 7/1995 | Moore et al. . |
| 5,440,707 | 8/1995 | Hayes et al. . |
| 5,546,555 | 8/1996 | Horstmann et al. . |
| 5,604,879 | 2/1997 | Beavers et al. . |
| 5,906,001 | 5/1999 | Wu et al. ............................... 711/141 |

OTHER PUBLICATIONS

Teller, P., "Translation–Lookaside Buffer Consistency", IEEE Computer, vol. 23, Iss. 6, Jun. 1990, pp. 26–36.

Rosenburg, B., "Low–Synchronization Translation Lookaside Buffer Consistency in Large–Scale Shared–Memory Multiprocessors", Proc. Twelfth Symp. Operating Systems Principles, Dec. 1989, pp. 137–146.

Black, D., et al., "Translation Lookaside Buffer Consistency: A Software Approach", Proc. Third Int'l Conf. Architectural Support for Programming Languages and Operating Systems, 1989, pp. 113–122.

IBM Technical Disclosure Bulletin, "Synchronization of TLB Invalidate Broadcasts using a TLBSYNC Command", vol. 37, No. 5, May 1994.

*Primary Examiner*—Eddie P. Chan
*Assistant Examiner*—Yamir Encarnacion
*Attorney, Agent, or Firm*—Anthony V. S. England; Felsman, Bradley, Vaden, Gunter & Dillon, LLP

[57] ABSTRACT

A data processing system includes at least a first processor and a second processor that each have a respective translation lookaside buffer (TLB). In response to detection by the second processor of a TLB entry invalidation request, the second processor marks at least one memory referent instruction that is being processed by the second processor and invalidates a TLB entry in the TLB of the second processor. In response to receipt of a synchronization request at the second processor, the second processor indicates to the first processor that the second processor has invalidated the TLB entry if the second processor has completed processing the marked instruction. During the interval between receipt of the synchronization request and indicating to the first processor that the second processor has invalidated the TLB entry, the second processor continues to process instructions, including fetching instructions for processing. In this manner, the second processor is able to continue normal instruction processing during the process of TLB synchronization.

16 Claims, 7 Drawing Sheets

DATA PROCESSING SYSTEM AND METHOD FOR MAINTAINING TRANSLATION LOOKASIDE BUFFER TLB COHERENCY WITHOUT ENFORCING COMPLETE INSTRUCTION SERIALIZATION

BACKGROUND OF THE INVENTION

1. Technical Field

The present invention relates in general to a method and system for data processing and, in particular, to a data processing system and method for maintaining translation lookaside buffer (TLB) coherency in a data processing system. Still more particularly, the present invention relates to a data processing system and method that maintain TLB coherency without enforcing instruction serialization.

2. Description of the Related Art

The data storage system of a computer system typically includes one or more nonvolatile mass storage devices, such as magnetic or optical disks, and a volatile random access memory (RAM), which can include both low latency cache memory and higher latency system memory. In order to provide enough addresses for memory-mapped input/output (I/O) and the data and instructions utilized by operating system and application software, computer systems also typically reference an effective address space that includes a much larger number of addresses than physically exist in memory mapped I/O and RAM. Therefore, to perform memory-mapped I/O or to access RAM, a processor within a computer system that utilizes effective addressing is required to translate an effective address into a physical address assigned to a particular I/O device or a physical location within RAM.

In the PowerPC™ RISC architecture, which is described, for example, in *PowerPC™ 603 RISC Microprocessor User's Manual*, which is available from International Business Machines (IBM) Corporation of Armonk, N.Y. as Order No. MPR603UMU-01 and incorporated herein by reference, the effective address space is partitioned into a number of uniformly-sized memory pages, where each page has an address descriptor called a Page Table Entry (PTE). The PTE corresponding to a particular memory page contains the base effective address of the memory page as well as the associated base physical address of the page frame, thereby enabling a processor to translate any effective address within the memory page into a physical address in memory. The PTEs, which are created in RAM by the operating system, reside in Page Table Entry Groups (PTEGs), which can each contain, for example, up to eight PTEs.

In order to expedite the translation of effective addresses to physical addresses during the processing of memory-mapped I/O and memory access instructions (hereinafter, referred to simply as memory referent instructions), conventional processors often employ one or more translation lookaside buffers (TLBs) to cache recently accessed PTEs within the processor's core. Of course, as data are moved into and out of physical locations in memory (e.g., in response to the invocation of a new process or a context switch), the entries in the TLB must be updated to reflect the presence of the new data, and the TLB entries associated with data removed from memory must be invalidated. In many conventional processors such as the PowerPC™ line of processors available from IBM Corporation, the invalidation of TLB entries is the responsibility of software and is accomplished through the use of an explicit TLB invalidate entry instruction (e.g., TLBIE in the PowerPC™ instruction set architecture).

In multiprocessor data processing systems in which multiple processors have access to system memory (e.g., a symmetric multiprocessor (SMP)), the invalidation of a PTE cached in an entry of a processor's TLB is complicated by the fact that each processor has its own respective TLB. In order to maintain a coherent view of system memory across all the processors, the invalidation of a PTE in one processor requires the invalidation of the TLB entries, if any, within other processors that cache the same PTE. In many conventional multiprocessor computer systems, the invalidation of PTEs in all processors in the system is accomplished by the execution of a TLB invalidate entry instruction within an initiating processor and the broadcast of a TLB invalidate entry request from the initiating processor to each other processor in the system. The TLB invalidate entry instruction (or instructions, if multiple TLB entries are to be invalidated) may be followed in the instruction sequence of the initiating processor by one or more synchronization instructions that guarantee that the TLB entry invalidation has been performed by all processors. In conventional multiprocessor computer systems, the TLB invalidate entry instruction and associated synchronization instructions are strictly serialized, meaning that the initiating processor must complete processing each instruction (e.g., by broadcasting the TLB invalidate entry request to other processors) before beginning to process the next instruction. As a result, the processor initiating a TLB entry invalidation incurs a large performance penalty, particularly when processing instructions sequences including multiple TLB invalidate entry instructions.

The invalidation of TLB entries also adversely affects the performance of non-initiating processors. In particular, a conventional processor typically responds to a TLB synchronization request received from another processor by halting its instruction fetcher and permitting the remainder of the instructions within the processor to complete execution. After the processor's execution pipeline has completely drained of instructions, the TLB synchronization transaction is permitted to complete, and fetching of instructions is thereafter resumed. Thus, the process of invalidating TLB entries in non-initiating processors can entail several idle cycles at each stage in the processor's execution pipeline due to the suspension of instruction fetching.

In view of the performance penalty associated with TLB entry invalidations in conventional multiprocessor computer systems, the present invention recognizes that it would be useful and desirable to provide an improved method for maintaining TLB coherency in a multiprocessor computer system.

SUMMARY OF THE INVENTION

It is therefore one object of the present invention to provide an improved method and system for data processing.

It is another object of the present invention to provide an improved data processing system and an improved method for maintaining translation lookaside buffer (TLB) coherency in a data processing system.

The foregoing objects can be achieved as is now described. A data processing system includes at least a first processor and a second processor that each have a respective translation lookaside buffer (TLB). In response to detection by the second processor of a TLB entry invalidation request, the second processor marks at least one memory referent instruction that is being processed by the second processor and invalidates a TLB entry in the TLB of the second processor. In response to receipt of a synchronization request at the second processor, the second processor indicates to the first processor that the second processor has invalidated the TLB entry if the second processor has completed processing the marked instruction. During the interval between receipt of the synchronization request and indicating to the first processor that the second processor has invalidated the TLB entry, the second processor continues to process instructions, including fetching instructions for processing. In this manner, the second processor is able to continue normal instruction processing during the process of TLB synchronization.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
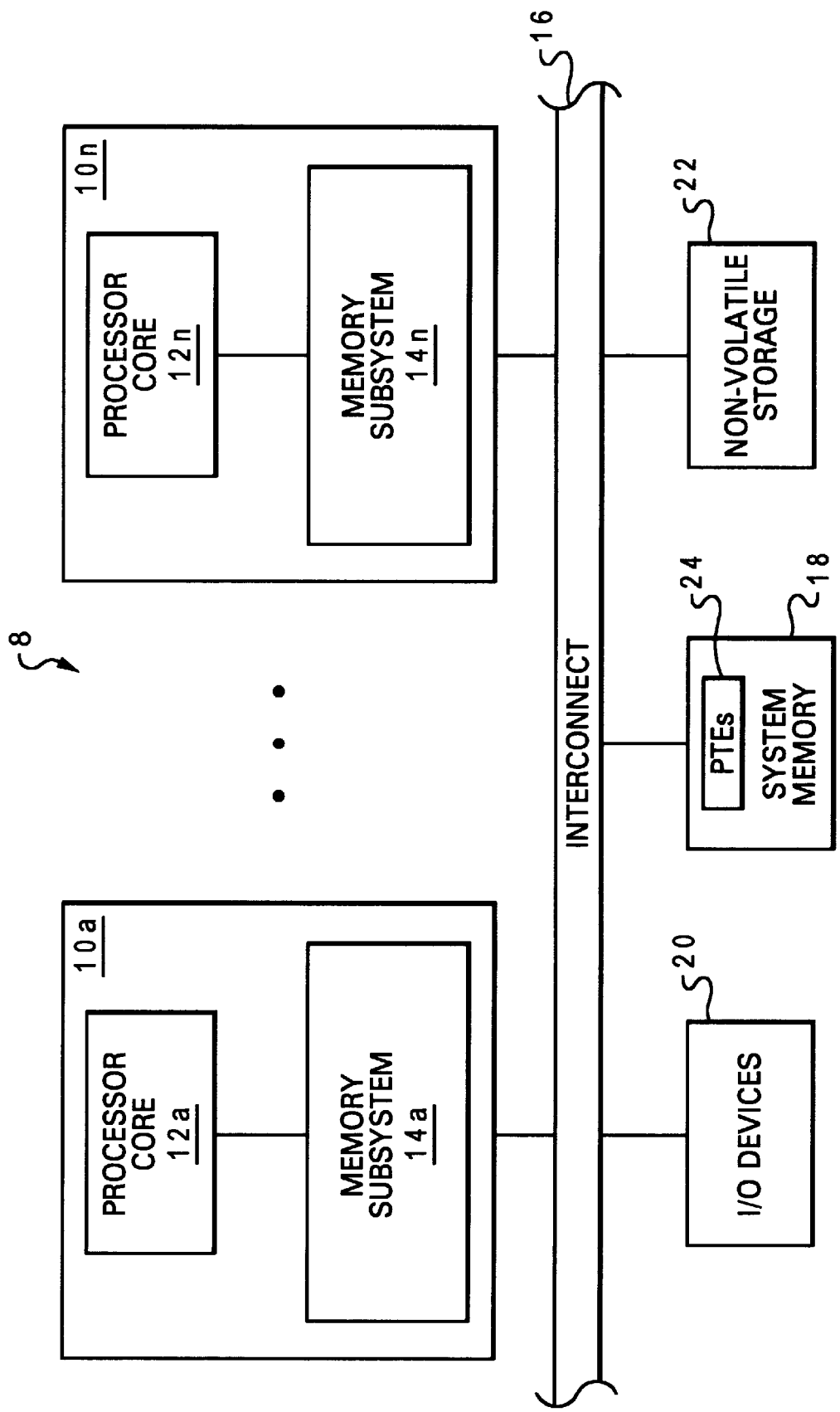
FIG. 1 depicts an illustrative embodiment of a multiprocessor data processing system in accordance with the present invention.

With reference now to the figures, and in particular with reference to FIG. 1, there is depicted a high level block diagram of an illustrative embodiment of a multiprocessor data processing system in accordance with the present invention. As depicted, data processing system 8 is an SMP system including a number of processors 10a–10n, which each preferably comprise one of the PowerPC™ line of processors available from IBM Corporation of Armonk, N.Y. In addition to the conventional registers, instruction flow logic and execution units utilized to execute program instructions, which are collectively designated as processor core 12, each of processors 10a–10n also includes a respective memory subsystem 14, which may include, for example, two or more levels of cache memory. This cache hierarchy within each memory subsystem 14 temporarily caches instructions and data retrieved from system memory 18 that are likely to be accessed by the associated processor core 12. Although not illustrated in FIG. 1, lower levels of the cache hierarchy can be shared by multiple processor cores 12, as is well-known in the art.

As illustrated, data processing system 8 further includes I/O devices 20 and non-volatile storage 22, which, together with processors 10 and system memory 18, are coupled to interconnect 16. I/O devices 20 comprise conventional peripheral devices, such as a display device, keyboard, and graphical pointer, which are interfaced to interconnect 16 via conventional adapters. Non-volatile storage 22 stores an operating system and other software, which are loaded into volatile system memory 18 in response to data processing system 8 being powered on. As discussed above, the operating system software creates page table entries (PTEs) 24 in system memory 18 to support effective-to-physical address translation. Individual ones of these PTEs can be cached in the translation lookaside buffers (TLBs) in processor cores 12 to expedite address translation. Of course, those skilled in the art will appreciate that data processing system 8 can include many additional components that are not shown in FIG. 1, such as serial and parallel ports for connection to networks or attached devices, a memory controller that regulates access to system memory 18, etc.

Interconnect 16, which can comprise one or more buses or a cross-point switch, serves as a conduit for communication transactions between processors 10, system memory 18, input/output (I/O) devices 20, and non-volatile storage 22. A typical communication transaction on interconnect 16 includes a source tag indicating the source of the transaction, a destination tag specifying the intended recipient(s) of the transaction, a transaction type field, an address and/or data. In embodiments in which interconnect 16 includes a broadcast fabric (e.g., a bus), each device connected to interconnect 16 preferably snoops all communication transactions on interconnect 16.

Figure 2:
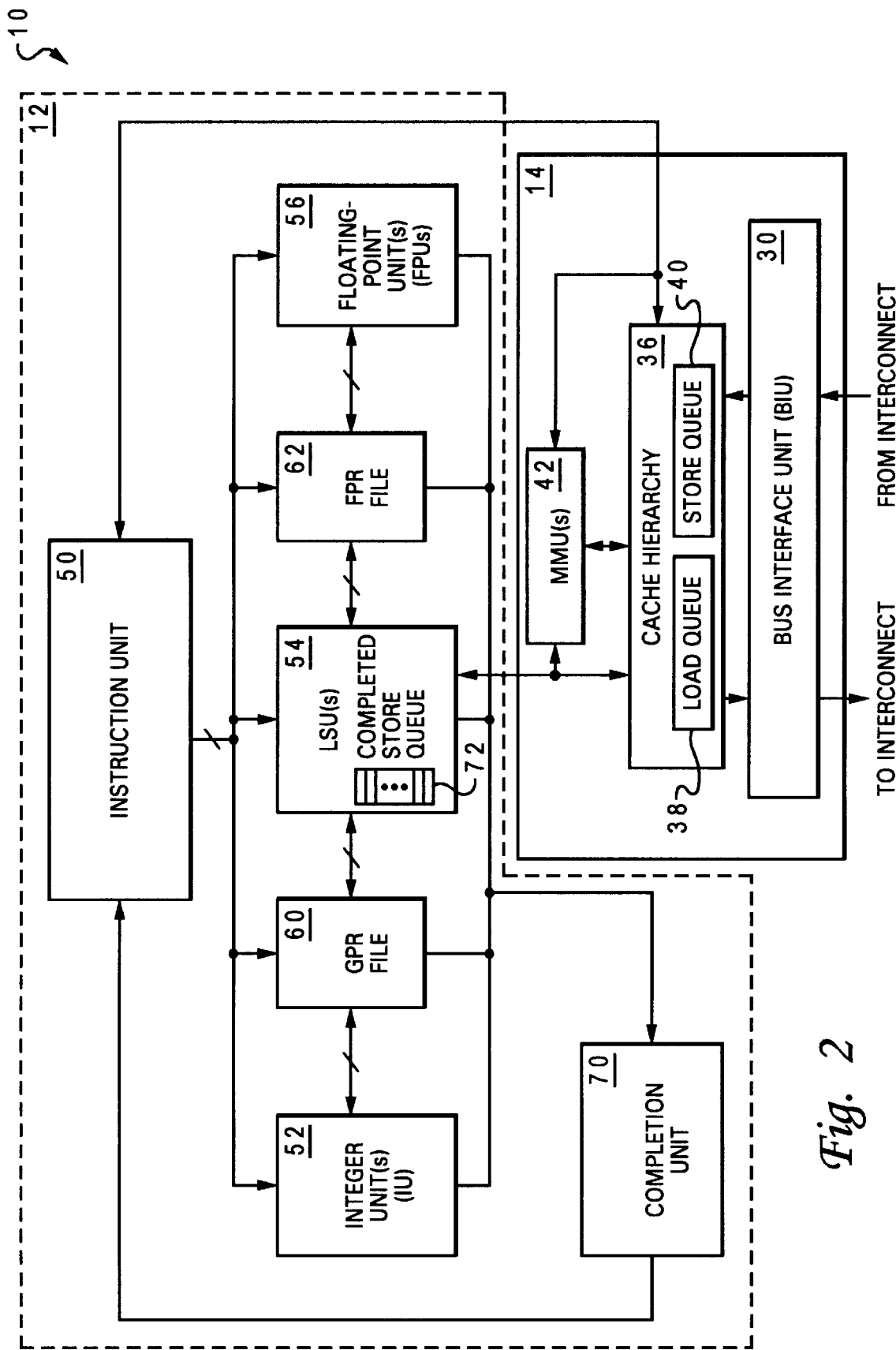
FIG. 2 is a more detailed block diagram of a processor within the multiprocessor data processing system shown in FIG. 1.

Referring now to FIG. 2, there is depicted a block diagram of an illustrative embodiment of a processor 10 within data processing system 8. In the depicted illustrative embodiment, processor 10 is a single integrated circuit superscalar microprocessor that includes various execution units, registers, buffers, memories, and other functional units, which are all formed by integrated circuitry. Although, as noted above, processor 10 preferably comprises one of the PowerPC™ line of RISC processors, those skilled in the art will appreciate from the following description that other suitable processors and processor architectures can alternatively be utilized.

As illustrated in FIG. 2, processor 10 is coupled to interconnect 16 by a bus interface unit (BIU) 30 within memory subsystem 14. BIU 30 issues communication transactions on interconnect 16 based upon memory referent and other instructions buffered within load queue 38 and store queue 40, which generally buffer load and store instructions, respectively. BIU 30 also receives (snoops) transactions from interconnect 16 and responds to such communication transactions by initiating appropriate actions internally and/or within memory subsystem 14 and processor core 12. The actions that may be initiated in response to snooping a communication transaction include, without limitation, sourcing data cached within cache hierarchy 36 on interconnect 16, updating the coherency state of cached data, and, as discussed further below, invalidating entries within the TLB of processor 10. As indicated in FIG. 2, memory subsystem 14 further includes one or more memory management units (MMUs) 42 for translating effective addresses received from processor core 12 into physical (real) addresses that identify particular physical locations in system memory 18.

Memory subsystem 14 is coupled to instruction unit 50 of processor core 12, which fetches instructions from cache hierarchy 36. Instruction unit 50 processes branch instructions utilizing an internal branch processing unit (BPU), and temporarily buffers sequential instructions until the sequential instructions can be dispatched by instruction unit 50 to the sequential execution circuitry of processor core 12. In the depicted illustrative embodiment, the sequential execution circuitry of processor core 12 comprises multiple execution units for executing sequential instructions, including one or more integer units (IUs) 52, load-store units (LSUs) 54, and floating-point units (FPUs) 56. Each of execution units 52, 54, and 56 typically executes one or more instructions of a particular type of sequential instructions during each processor cycle. For example, IU 52 performs integer mathematical and logical operations such as addition, subtraction, ANDing, ORing, and XORing, utilizing source operands received from specified general purpose registers (GPRs) or GPR rename buffers within GPR file 60. Following the execution of an integer instruction, IU 52 outputs the data results of the instruction to GPR file 60. FPU 56 typically performs single and double-precision floating-point arithmetic and logical operations, such as floating-point multiplication and division, on source operands received from floating-point registers (FPRs) or FPR rename buffers within FPR file 62. FPU 56 outputs data resulting from the execution of floating-point instructions to FPR file 62. As its name implies, LSU 54 typically executes floating-point and integer instructions that either load data from memory (i.e., either cache hierarchy 36 or system memory 18) into GPR file 60 or FPR file 62 or that store data from GPR file 60 or FPR file 62 to memory. In addition, LSU preferably performs memory management, cache control, and instruction synchronization operations (although in an alternative embodiment these operations could be handled by one or more other execution units).

Processor 10 preferably employs both pipelining and out-of-order execution of instructions to further improve the performance of its superscalar architecture. Accordingly, multiple instructions can typically be executed by IU 52, LSU 54, and FPU 56 concurrently without respect to program ordering as long as data dependencies are observed. In addition, instructions are processed by processor 10 at a number of pipeline stages, including fetch, decode/dispatch, execute, finish, completion, and writeback.

During the fetch stage, instruction unit 50 retrieves one or more instructions associated with one or more memory addresses from cache hierarchy 36. The fetched instructions are then decoded, and the sequential instructions among them are dispatched to execution units 52, 54, and 56 during the decode/dispatch stage. Instruction unit 50 allocates temporary storage within GPR file 60 or FPR file 62 for each dispatched instruction that will generate result data. Upon dispatch, instructions are also stored within the multiple-slot completion buffer of completion unit 70 to await completion.

During the execute stage, execution units 52, 54, and 56 execute instructions received from instruction unit 50 opportunistically as operands and execution resources for the indicated operations become available. Each of execution units 52, 54, and 56 are preferably equipped with a reservation station that stores instructions dispatched to that execution unit until operands or execution resources become available. After execution of an instruction has finished, execution units 52, 54, and 56 store data results, if any, within either GPR file 60 or FPR file 62, depending upon the instruction type. Then, execution units 52, 54, and 56 notify completion unit 70 which instructions have finished execution. Instructions can then be completed in program order out of the completion buffer of completion unit 70, and the data results can be written back to architected registers. Instructions executed by IU 52 and FPU 56 are written back by transferring data results of the instructions from rename buffers to architected GPRs and FPRs. Load and store instructions, on the other hand, executed by LSU 54 are written back by transferring the finished instructions to a completed load queue or completed store queue 72 from which the load and store operations indicated by the instructions will be performed.

Figure 3:
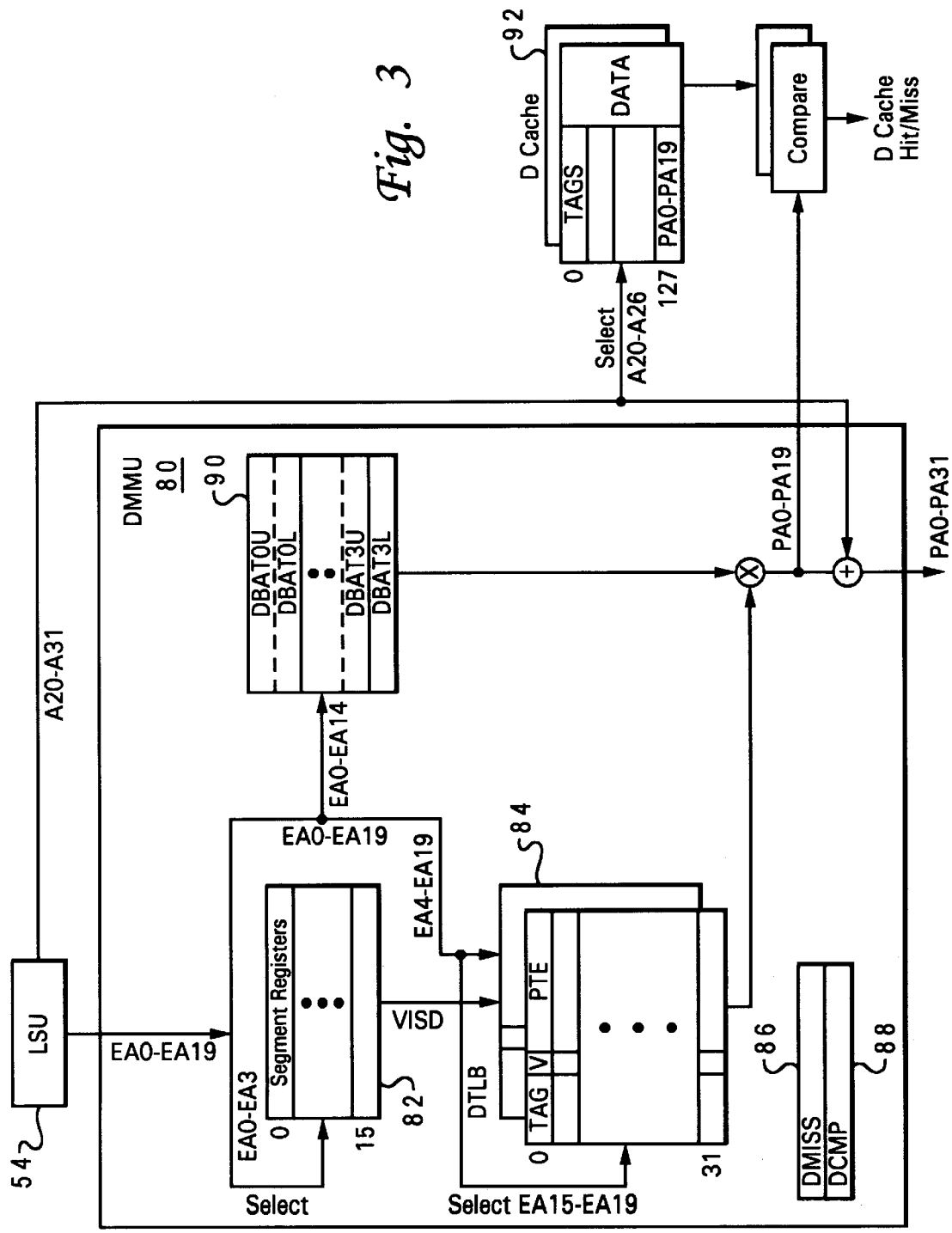
FIG. 3 is a more detailed block diagram of a memory management unit (MMU) within the processor illustrated in FIG. 2.

Referring now to FIG. 3, there is depicted a more detailed block diagram of an exemplary embodiment of a MMU within MMUs 42 of FIG. 2. In particular, FIG. 3 illustrates a data MMU (DMMU) utilized to translate effective addresses (EAs) specified within data access requests received from LSU 54 into physical addresses assigned to locations within system memory 18 and to translate EAs specified in memory mapped I/O requests into addresses of devices within data processing system 8. In order to permit simultaneous address translation of data and instruction addresses and therefore enhance processor performance, MMUs 42 preferably contains a corresponding address translation mechanism (i.e., an instruction MMU) for translating EAs contained within instruction requests received from instruction unit 50 into physical addresses within system memory 18.

In the exemplary embodiment shown in FIG. 3, it is assumed that each processor core 12 utilizes 32-bit effective addresses and therefore is able to reference a four gigabyte ($2^{32}$) effective address space. (Of course, other embodiments may utilize 64 or more address bits.) This four gigabyte effective address space is subdivided in at least two ways in order to facilitate effective-to-physical address translation. First, the effective address space is partitioned into a number of uniformly-sized (e.g., 4 kilobyte) memory pages, which each have a Page Table Entry (PTE) address descriptor that associates the effective address of the memory page with the corresponding physical address of the page frame in system memory 18. The effective address space is also subdivided into sixteen 256-megabyte segments that represent the largest sub-units of the effective address space. Optionally, the operating system may also define one or more variably-sized "blocks" of effective address space that are subject to block address translation.

As illustrated, DMMU 80 contains segment registers 82, which are utilized to store the 24-bit Segment Identifier (SID) of each of the sixteen 256-megabyte regions into which the four gigabyte effective address space of processor 10 is subdivided. A SID stored within a particular segment register is selected by the 4 highest-order bits (bits 0–3) of an EA received by DMMU 80. DMMU 80 also includes Data Translation Lookaside Buffer (DTLB) 84, which in the depicted embodiment is a two-way set associate cache for storing copies of recently-accessed PTEs. DTLB 84 contains 32 congruence classes, which are indexed by bits 15–19 of the EA. The two TLB entries within a particular congruence class of DTLB 84 are differentiated by an address tag formed by bits 10–14 of the EA. The validity of the contents of a TLB entry are indicated by a valid (V) bit that forms the first bit of a PTE, but is illustrated separately in FIG. 3 for clarity. In the event that the PTE required to translate an effective address is not resident within DTLB 84, DMMU 80 stores that 32-bit EA that caused the DTLB miss within DMISS register 86. In addition, DMMU 80 stores the SID corresponding to the EA and selected bits of the EA within DCMP register 88 for comparison with PTEs during a page table search operation. As shown, DMMU 80 further includes Data Block Address Table (DBAT) array 90, which is utilized by DMMU 80 to translate the EAs falling within predefined data blocks.

Utilizing these components, DMMU 80 translates EAs into physical addresses as follows. LSU 54 first initiates address translation by transmitting a 32-bit target EA of a memory referent instruction to DMMU 80. If the memory referent instruction is a store instruction, the store instruction is enqueued in store queue 40 after successful address translation. Load instructions, on the other hand, are enqueued in load queue 38 after address translation only if the load misses in cache hierarchy 36 or is otherwise required to be made visible on interconnect 16. Bits 0–3 of the 32-bit EA received by DMMU 80 are then utilized to select one of the 16 segment registers 82. The 24-bit SID stored in the selected segment register, which together with the 16-bit page index (bits 4–19) and 12-bit byte offset (bits 20–31) of the EA forms a 52-bit virtual address, is passed to DTLB 84. Bits 15–19 of the EA then select a particular congruence class of DTLB 84. Bits 10–14 of the EA are compared to the address tags associated with each of the two PTEs in the selected congruence class, and the selected SID and bits 4–9 of the EA are compared with corresponding fields in the two PTEs. In addition, the valid (V) bit of each PTE is checked. If the comparisons indicate that a match is found between the EA and one of the two PTEs in the selected congruence class, the matching PTE is checked for an exception. If no exception related to that PTE is detected, a 20-bit Physical Page Number (PPN) contained in the matching PTE is concatenated with the 12-bit byte offset specified in the EA to produce a 32-bit physical address. This 32-bit physical address can be utilized to access requested data in cache hierarchy 36, as depicted in FIG. 3 with respect to an illustrative level one data cache 92, and/or to include within communication transactions (e.g., data requests or memory mapped I/O) issued on interconnect 16 by BIU 30.

As discussed hereinabove, the invalidation or other modification of a TLB entry in one processor 10 requires the invalidation of TLB entries in all other processors 10 in order to maintain a coherent view of the contents of system memory 18. In the preferred embodiment of multiprocessor data processing system 8 discussed above in which processors 10 are PowerPC™ processors, a processor 10 initiates TLB invalidation in response to processing a sequence of instructions including TLBIE(s)-SYNC-TLBSYNC-SYNC or similar instructions. In this instruction sequence, the four listed instructions can be interleaved with other instructions, but will be processed in the listed order due to the serialization enforced by the SYNC (i.e., synchronization) instructions. The TLBIE instruction (of which there may be multiples if multiple TLB entries are to be invalidated) can alternatively be replaced with a TLB entry-modifying instruction, and at least the first SYNC instruction can be replaced with another form of serializing instruction such as EIEIO (Enforce In-order Execution of I/O).

Figure 4A:
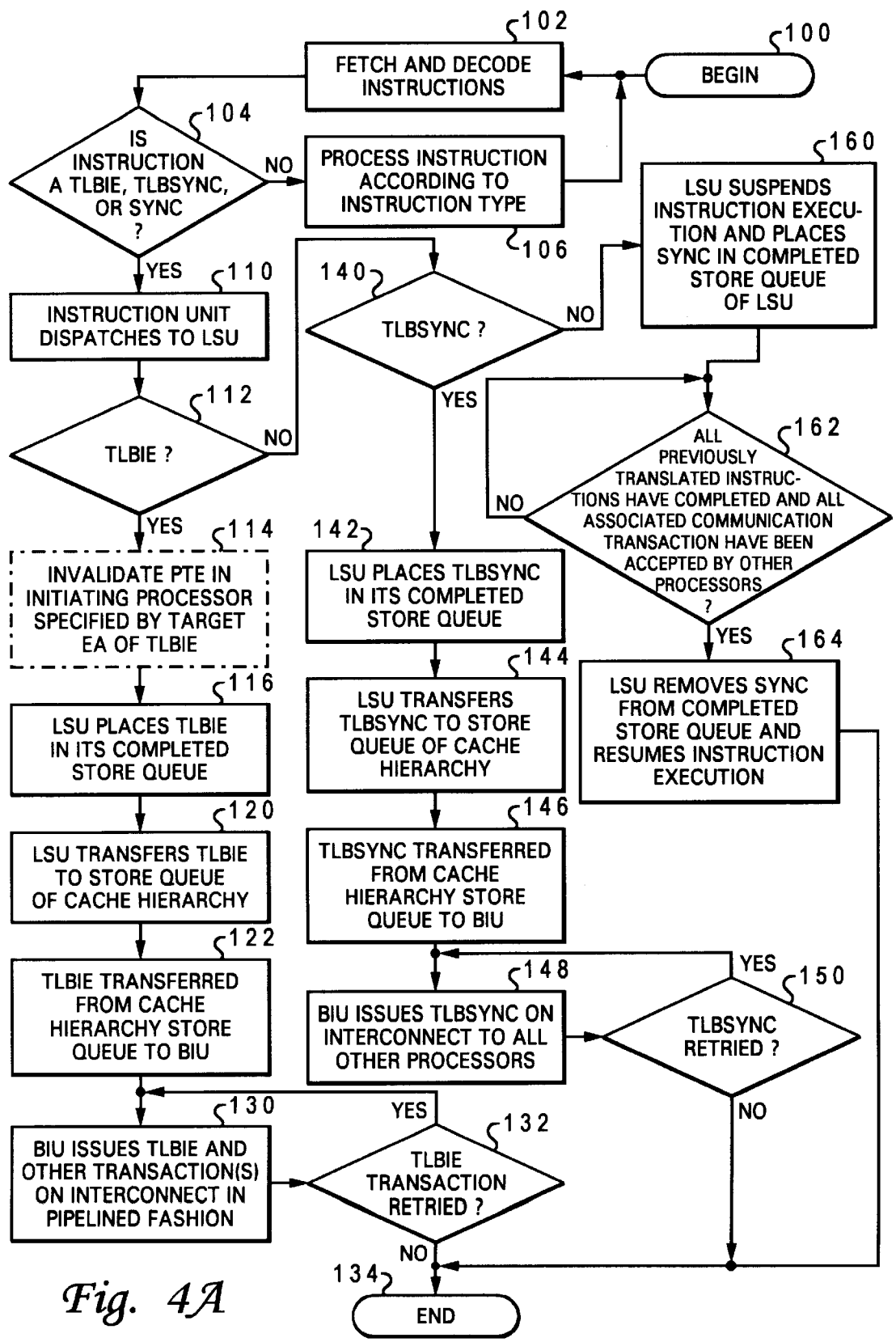
FIG. 4A is a high level logical flowchart of an exemplary method for processing instructions in a TLB invalidation sequence within an initiating processor.
Figure 4B:
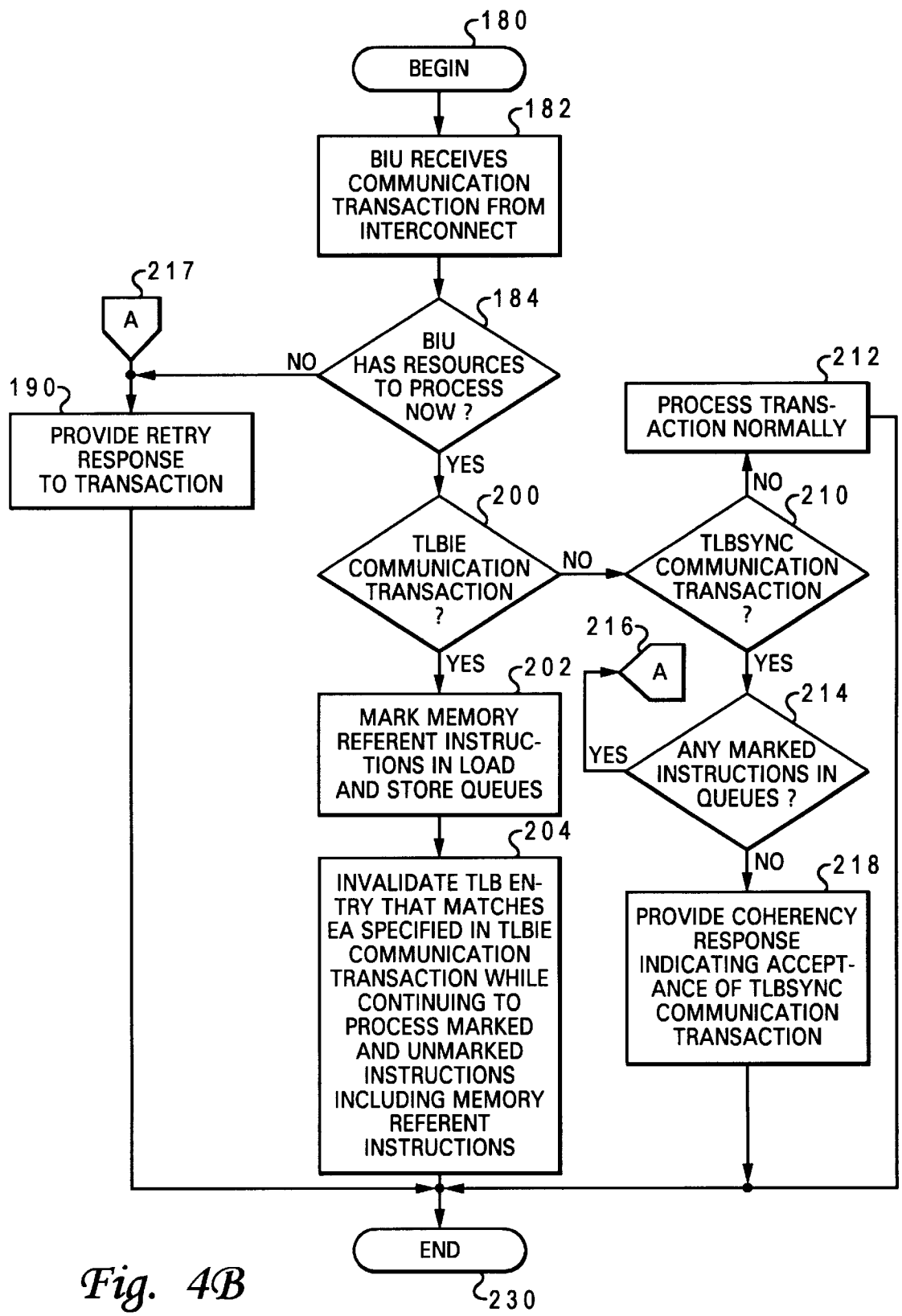
FIG. 4B is a high level logical flowchart of an exemplary method for invalidating a TLB entry in an snooping processor in accordance with the present invention.

With reference now to FIGS. 4A and 4B, there are depicted two high level logical flowcharts that together illustrate a method for maintaining TLB coherency in a multiprocessor data processing system in accordance with the present invention. FIG. 4A first illustrates a method for processing a sequence of instructions within an initiating processor in order to initiate invalidation of one or more TLB entries. FIG. 4B then depicts a method for invalidating TLB entries in all processors of the multiprocessor data processing system.

Referring first to FIG. 4A, the method begins at block 100 and then proceeds to block 102, which illustrates instruction unit 50 of a processor 10a fetching the next group of instructions from its cache hierarchy 36. During the decode stage, the instructions are at least partially decoded to determine the instruction type. As indicated at blocks 104 and 110, if a decoded instruction is one of the TLBIE, SYNC, or TLBSYNC instructions, the instruction is dispatched to LSU 54. Otherwise, the decoded instruction is processed by the execution circuitry of processor 10a according to its instruction type as shown at block 106, and the process returns to block 102.

If an instruction dispatched to LSU 54 at block 110 is a TLBIE instruction, the TLBIE instruction is processed within processor 10a as illustrated at blocks 112–134. As indicated by the use of dashed-line illustration at block 114, the TLBIE can be processed by processor 10a in one of two ways. First, as depicted at block 114, LSU 54 can process the TLBIE itself and instruct MMUs 42 to invalidate the PTE or PTEs that translate the target EA specified by the TLBIE instruction. In that case, the TLB entry invalidation process illustrated in FIG. 4B is applicable only to processors other than processor 10a, the initiating processor. Alternatively, the invalidation of the TLB entry in both initiating processor 10a and the other processors 10 can be handled according to the process shown in FIG. 4B. In this case, block 114 is omitted, and the process shown in FIG. 4A passes directly from block 112 to block 116. Block 116 illustrates LSU 54 placing the TLBIE instruction in completed store queue 72. As an entry becomes available in store queue 40 of cache hierarchy 36, the TLBIE instruction is then transferred to store queue 40, as depicted at block 120.

Figure 5A:
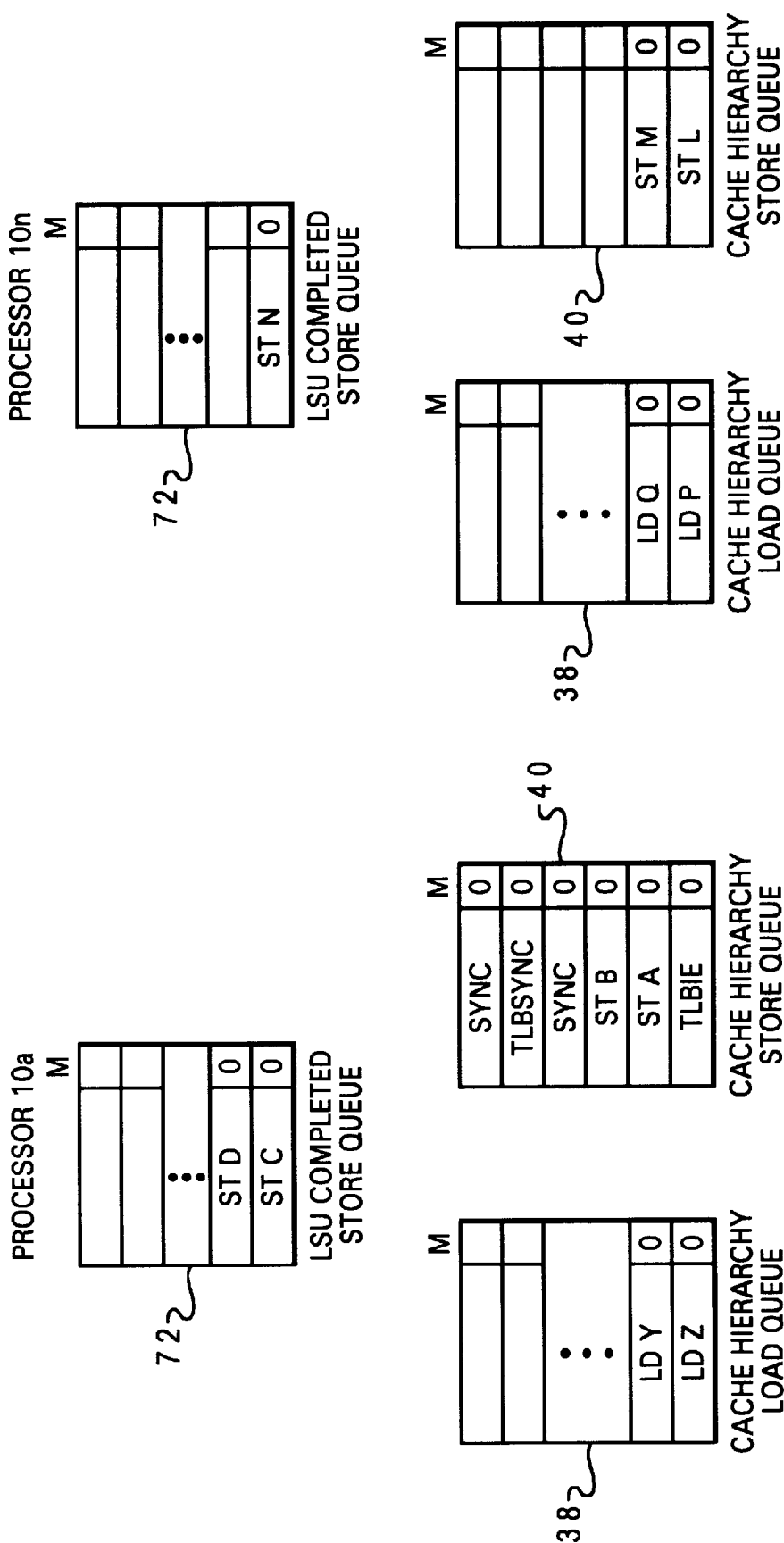
FIG. 5A illustrates the state of the load and store queues of processors within the data processing system illustrated in FIG. 1 prior to invalidating a TLB entry.

With reference now to FIG. 5A, the state of the queues within processors 10a and 10n during an exemplary TLB invalidation scenario is illustrated. As depicted, the queue structure in each processor 10 includes completed store queue 72 within LSU 54 and load and store queues 38 and 40 within cache hierarchy 36. Each of these queues can be comprised of a number of entries, which each have an associated "marked" bit M. As shown in FIG. 5A, following block 120 of FIG. 4A, the TLBIE instruction will be stored in store queue 40 of processor 10a, possibly in conjunction with store instructions, such as ST A and ST B. The SYNC and TLBSYNC instructions within the TLB invalidation sequence are also processed through the store queue pipeline of processor 10a, as shown in FIG. 5A and as discussed further hereinbelow. (Of course, there is no requirement that the SYNC and TLBSYNC instructions be held in store queue 72 or store queue 40 concurrently with the TLBIE instruction.) As indicated, before a first TLBIE has been made visible on interconnect 16, all of the load, store, TLBIE, SYNC and TLBSYNC instructions are unmarked (i.e., the associated M bits are 0).

Returning to block 120 of FIG. 4A, the process then proceeds to block 122, which illustrates memory hierarchy 36 passing the TLBIE instruction from store queue 40 to BIU 30. In response to receipt of the TLBIE instruction, BIU 30 issues a TLBIE communication transaction on interconnect 16, as depicted at block 130. The TLBIE communication transaction is broadcast to all processors to instruct each processor to invalidate its respective TLB entry (or entries) that translates the target EA specified in the communication transaction. The TLBIE communication transaction is issued in a pipelined fashion with any other pending communication transactions, meaning that responses to the TLBIE communication transaction need not be received from the other processors 10 before processor 10a issues the next transaction. Pipelining communication transactions is particularly advantageous when processing instruction sequences including multiple closely-spaced TLBIE instructions. In the event that a TLBIE communication transaction is retried, indicating that a snooping processor is presently unable to process the TLBIE communication transaction, the initiating processor simply reissues the TLBIE communication transaction at a later time, as illustrated by the process passing from block 130 to block 132 and returning to block 130. In this manner, subsequent TLBIE or other communication transactions are not delayed by the retry of an earlier TLBIE communication transaction, thereby enhancing overall system performance through out-of-order processing of TLBIE communication transactions. Finally, if no retry response is received from a processor 10 in response to the TLBIE communication transaction, the processing of a TLBIE instruction terminates at block 134.

Still referring to FIG. 4A, following the processing of one or multiple TLBIE instructions in the manner discussed above, a SYNC (or EIEIO) instruction will appear in the TLB invalidation instruction sequence to enforce in-order execution of the TLBSYNC with respect to preceding TLBIE instructions. In other words, the first synchronizing instruction ensures that all preceding TLBIE communication transactions have been accepted by the other processors 10 before processor 10*a* makes the TLBSYNC visible on interconnect 16. Thus, if LSU 54 determines that an instruction dispatched to LSU 54 is a SYNC instruction as indicated by the process passing from block 112 to block 140 and then to block 160, LSU 54 temporarily suspends instruction execution and places the SYNC instruction in completed store queue 72. The process then iterates at block 162 until all previously initiated instructions have completed and all communication transactions associated with previously initiated instructions have been accepted by other processors. Following a determination that all previously initiated instructions have completed and all associated communication transactions have been accepted by the processors, the process proceeds to block 164, which depicts LSU 54 removing the SYNC from completed store queue 72 and resuming instruction execution. Thereafter, the process terminates at block 134. As noted above, following the TLBIE and synchronization instructions, the TLB invalidation instruction sequence will include a TLBSYNC instruction that verifies that all processors 10 in data processing system 8 have performed all the TLB entry invalidations specified by the TLBIE instruction(s). The TLBSYNC instruction is processed in processor 10*a* as shown at blocks 140–150 of FIG. 4A. Referring first to blocks 140 and 142, in response to a determination that a dispatched instruction is a TLBSYNC instruction, LSU 54 stores the TLBSYNC in completed store queue 72. Thereafter, the TLBSYNC moves through store queue 40 and is passed to BIU 30, as indicated at blocks 144 and 146. Then, as illustrated at block 148, BIU 30 issues a TLBSYNC communication transaction on interconnect 16. If the TLBSYNC communication transaction is retried by any processor 10, BIU 30 reissues the TLBSYNC transaction at a later time, as indicated by the process returning from block 150 to block 148. If the TLBSYNC communication transaction is not retried, thereby indicating that all of the TLB entry invalidations indicated by the preceding TLBIE communication transactions have been performed, the process depicted in FIG. 4A terminates at block 134. The SYNC instruction following the TLBSYNC is thereafter processed as described above with respect to blocks 160–164.

With reference now to FIG. 4B, there is depicted a high level logical flowchart of TLB entry invalidation process performed by a processor within a multiprocessor data processing system in response to the TLBIE and TLBSYNC communications transactions issued by the initiating processor. In embodiments of the present invention in which LSU 54 of initiating processor 10*a* triggers local invalidation of a TLB entry in response to receipt of a TLBIE instruction as depicted at optional block 114 of FIG. 4A, the process shown in FIG. 4B is performed by all processors 10 except initiating processor 10*a*. That is, BIU 30 of initiating processor 10*a* ignores snooped TLBIE and TLBSYNC communication transactions that identify processor 10*a* as the source processor. Alternatively, if LSU 54 of initiating processor 10*a* does not trigger TLB entry invalidation, the process shown in FIG. 4B is performed by all processors 10 in data processing systems, with minor differences at initiating processor 10*a* as noted below.

The process depicted in FIG. 4B begins at block 180 and proceeds to block 182, which illustrates BIU 30 of a processor 10 receiving (snooping) a communication transaction via interconnect 16. An initial determination is then made at block 184 if BIU 30 has resources (e.g., queue entries) currently available to process the communication transaction. If not, the process passes to block 190, which illustrates BIU 30 providing a retry response to the communication transaction, thereby indicating that BIU 30 of the processor 10 that issued the communication transaction must reissue the communication transaction at a later time. The process then passes to block 230 and terminates.

Referring again to block 184, in response to a determination that BIU 30 of the snooping processor 10 has resources available to process the communication transaction, the process proceeds to block 200. Block 200 depicts BIU 30 examining the communication transaction to determine its type. If the communication transaction is neither a TLBIE communication transaction nor a TLBSYNC communication transaction, the process passes to block 212, which represents conventional processing of the communication transaction. If the communication transaction is a TLBSYNC communication transaction, the communication transaction is processed at block 210 and subsequent blocks as described below. However, if the communication transaction is a TLBIE communication transaction, the process proceeds from block 200 to block 202, which illustrates BIU 30 of snooping processor 10 marking memory referent instructions in store queues 72 and 40 and load queue 38 by setting the associated marked bit to 1. In processors other than initiating processor 10*a*, all memory referent instructions in the queues are marked (non-memory referent instructions such as TLBIE, TLBSYNC, and SYNC are not marked). In response to self-snooping a TLBIE communication transaction, BIU 30 of initiating processor 10*a* marks only the memory referent instructions that are prior to the TLBSYNC instruction in program order. The program ordering of memory referent instructions in the queues with respect to the TLBSYNC instruction can be determined, for example, by comparing instruction identifiers assigned by instruction unit 50.

Figure 5B:
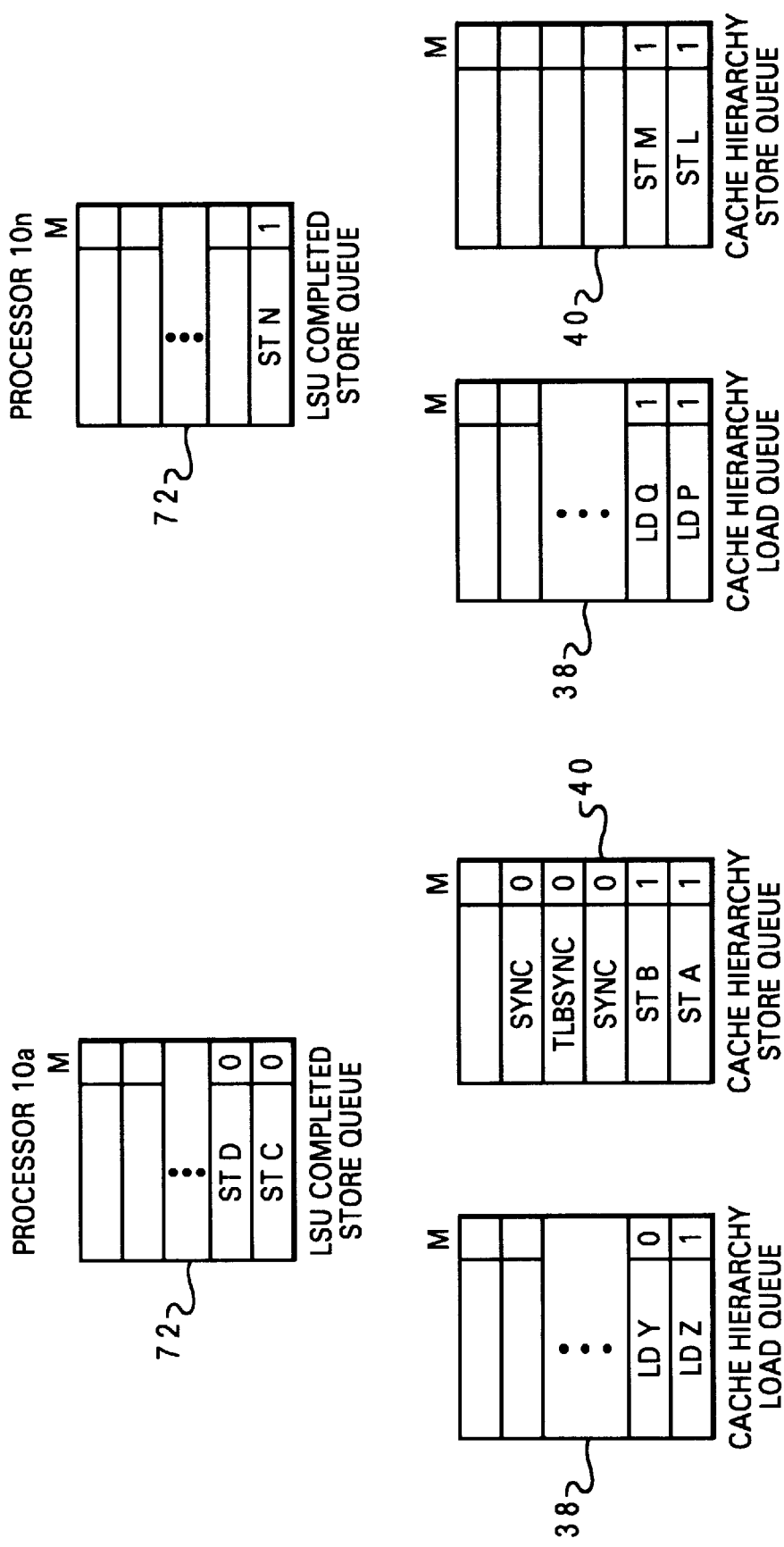
FIG. 5B depicts the state of the load and store queues of processors within the data processing system illustrated in FIG. 1 after invalidating a TLB entry.

Referring now to FIG. 5B, the state of the queues within processors 10*a* and 10*n* is illustrated at a point in the exemplary processing scenario following the marking of memory referent instructions. FIG. 5B assumes that TLB entry invalidation is performed by BIU of initiating processor 10*a* and not LSU 54. As is apparent upon comparison of FIGS. 5A and 5B, all of the memory referent instructions in the load and store queues of processor 10*n* have been marked. In addition, the memory referent instructions preceding the TLBSYNC instruction in processor 10*a*, namely, ST A, ST B, and LD Z, have been marked. In cases in which multiple TLBIE instructions appear in the instruction sequence prior to the TLBSYNC instruction, any memory referent instructions added to the queues of snooping processors 10 in the interval between snooping the first TLBIE transaction and snooping subsequent TLBIE transactions will be marked by BIU 30 in response to receipt of the subsequent TLBIE transactions.

Returning to block 202 of FIG. 4B, the process then proceeds to block 204, which depicts BIU 30 invalidating the TLB entry or entries that match the target EA specified in the TLBIE instruction and TLBIE communication transaction. For example, in a preferred embodiment, both TLB entries in the congruence class selected by the target EA are invalidated in all MMUS. This can result in four TLB entries being invalidated in response to a TLBIE if separate data and instruction MMUs are utilized. Importantly, the invalidation of the TLB entry or entries does not affect the processing of other marked and unmarked instructions (including memory referent instructions) by the snooping processor 10. The process thereafter terminates at block 230.

As discussed above, following one or more TLBIE communication transactions, initiating processor 10a will issue a TLBSYNC communication transaction to verify that the TLB entry invalidations specified by the TLBIE transactions have been performed. When this TLBSYNC communication transaction is snooped, as illustrated in FIG. 4B by the process proceeding though blocks 182, 184, 200, and 210 to block 214, logic (e.g., an OR gate receiving the M bits of all queues as inputs) within BIU 30 determines if any marked instructions remain in queues 38, 40 or 72 of the snooping processor 10. If so, the process passes through page connectors 216 and 217 to block 190, which depicts BIU 30 of snooping processor 10 providing a retry response to the TLBSYNC communication transaction. The retry of the TLBSYNC communication transaction forces initiating processor 10a to reissue the TLBSYNC transaction at a later time, as discussed above with respect to blocks 148 and 150 of FIG. 4A. In contrast to prior art system, snooping the TLBSYNC instruction does not cause snooping processors to stall instruction fetching. Instead, processing of marked and unmarked instructions continues normally at all stages of the processing pipelines of the snooping processors.

Referring again to block 214, if no marked instructions remain in the queues of snooping processor 10, the process illustrated in FIG. 4B proceeds to block 218. Block 218 illustrates BIU 30 of a snooping processor providing an appropriate response (which may be no response in certain communication protocols) to initiating processor 10a to indicate that BIU 30 has verified that all marked instructions (i.e., instructions that may have been translated utilizing the invalidated TLB entry or entries) have drained from the snooping processor. The process then passes to block 230 and terminates.

As has been described, the present invention provides an improved method for invalidating TLB entries in a data processing system. Among the benefits resulting from the present invention is that TLBIE instructions can be pipelined through the store queue hierarchy of the initiating processor rather than be strictly serialized. In this manner, the instruction throughput of the initiating processor is improved and the latency in making the TLBIE visible to other processors is reduced in processing scenarios in which multiple TLBIEs are closely spaced in the instruction stream. By marking instructions as described hereinabove, the present invention also permits non-initiating processors to continue normal instruction processing during the TLB entry invalidation process rather than enforcing serialization. As a result, the deleterious effect of TLB entry invalidations on overall system performance is largely mitigated.

While the invention has been particularly shown and described with reference to a preferred embodiment, it will be understood by those skilled in the art that various changes in form and detail may be made therein without departing from the spirit and scope of the invention. For example, although the invention has been described with reference to a SMP computer system, the present invention is also applicable to non-uniform memory access (NUMA) and other MP computer system topologies. In addition, while the present invention has been described with respect to particular instructions (viz. TLBIE, TLBSYNC, SYNC), it should be understood that the present invention is not limited to these particular instructions or the PowerPC™ instruction set architecture, and, in fact, can be applied to computer systems that handle TLB entry invalidation in hardware.

What is claimed is:

1. A method for maintaining translation lookaside buffer (TLB) coherency in a data processing system having at least a first processor and a second processor, said method comprising:

in response to detection by said second processor of a TLB entry invalidation request, marking at least one memory referent instruction being processed by said second processor and invalidating a TLB entry in said second processor;

in response to receipt of a synchronization request at said second processor, indicating to said first processor that said second processor has invalidated said TLB entry if said second processor has completed processing said marked instruction; and continuing to process instructions in said second processor during an interval between receipt of said synchronization request and indicating to said first processor that said second processor has invalidated said TLB entry, wherein continuing to process instructions includes fetching instructions for processing.

2. The method of claim 1, wherein continuing to process instructions in said second processor comprises processing at least one non-marked memory referent instruction within said second processor.

3. The method of claim 1, and further comprising:

indicating to said first processor that said synchronization request should be retransmitted if said second processor has not completed processing of said marked instruction.

4. The method of claim 1, and further comprising:

transmitting said TLB entry invalidation request from said first processor to said second processor in response to processing a TLB invalidate entry instruction in said first processor.

5. The method of claim 4, wherein said first processor includes a store queue that buffers store instructions, said method further comprising:

prior to transmitting said TLB entry invalidation request, queuing said TLB invalidate entry instruction within said store queue.

6. The method of claim 5, wherein queuing a TLB invalidate entry instruction comprises queuing a plurality of TLB invalidate entry instructions in said store queue.

7. The method of claim 6, wherein said plurality of TLB invalidate entry instructions are queued in said store queue in a first sequence, said method further comprising:

generating a plurality of TLB entry invalidation requests from said plurality of TLB invalidate entry instructions;

transmitting said plurality of TLB entry invalidation requests to said second processor; and processing said plurality of TLB entry invalidation requests within said second processor in a second sequence that is different than said first sequence.

8. The method of claim 5, and further comprising queuing at least one synchronization instruction in said store queue.

9. A data processing system, comprising:

a system memory;

at least a first processor and a second processor coupled to said system memory, said second processor including:

instruction processing circuitry that fetches and executes instructions;

a translation lookaside buffer (TLB) for translating addresses, said TLB including a plurality of entries;

means, responsive to detection of a TLB entry invalidation request, for marking at least one memory referent instruction being processed by said second processor and for invalidating a TLB entry in said TLB; and means, responsive to receipt of a synchronization request, for indicating to said first processor that said second processor has invalidated said TLB entry if said second processor has completed processing said marked instruction, wherein said instruction processing circuitry continues to process instructions during an interval between receipt of said synchronization request and indicating to said first processor that said second processor has invalidated said TLB entry, and wherein continuing to process instructions includes fetching instructions for processing.

10. The data processing system of claim 9, wherein said instruction processing circuity processes at least one non-marked memory referent instruction during said interval.

11. The data processing system of claim 9, wherein:

said data processing system further comprises an interconnect coupling said first and second processors;

said second processor includes an interconnect interface that indicates to said first processor that said synchronization request should be retransmitted if said second processor has not completed processing of said marked instruction.

12. The data processing system of claim 9, wherein said first processor includes instruction processing circuitry, and wherein said first processor transmits said TLB entry invalidation request to said second processor in response to processing a TLB invalidate entry instruction.

13. The data processing system of claim 12, wherein said instruction processing circuitry of said first processor includes a store queue that buffers said TLB invalidate entry instruction prior to said first processor transmitting said TLB entry invalidation request.

14. The data processing system of claim 13, wherein said store queue is capable of buffering a plurality of TLB invalidate entry instructions.

15. The data processing system of claim 14, wherein said plurality of TLB invalidate entry instructions are queued in said store queue in a first sequence, said data processing system further comprising:

means for generating a plurality of TLB entry invalidation requests from said plurality of TLB invalidate entry instructions;

means for transmitting said plurality of TLB entry invalidation requests to said second processor; and means for processing said plurality of TLB entry invalidation requests within said second processor in a second sequence that is different than said first sequence.

16. The data processing system of claim 13, wherein said store queue buffers a synchronization instruction.

* * * * *